United States Patent
Milenkovic et al.

(10) Patent No.: US 7,366,806 B2
(45) Date of Patent: Apr. 29, 2008

(54) METHOD AND APPARATUS FOR RFID TAG WHEREIN MEMORY OF RFID TAG IS PARTITIONED INTO TWO SECTIONS FOR READING USING WIRELESS INTERFACE AND WRITING USING BUS

(75) Inventors: Milan Milenkovic, Portland, OR (US); Vijay Tewari, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 10/900,638

(22) Filed: Jul. 27, 2004

(65) Prior Publication Data

US 2006/0026316 A1 Feb. 2, 2006

(51) Int. Cl.
*G06F 13/38* (2006.01)
*H04Q 7/20* (2006.01)

(52) U.S. Cl. .............. 710/62; 710/5; 710/33; 710/72; 340/10.51; 340/572.1; 340/572.4; 455/41.1

(58) Field of Classification Search .............. 710/62, 710/72, 5, 33; 340/572.1, 572.4, 10.51; 455/41.1
See application file for complete search history.

(56) References Cited

U.S. PATENT DOCUMENTS

| | | | | |
|---|---|---|---|---|
| 5,929,778 | A | * | 7/1999 | Asama et al. ............. 340/10.51 |
| 6,046,676 | A | * | 4/2000 | Ward et al. ............... 340/572.1 |
| 6,232,877 | B1 | * | 5/2001 | Ashwin .................... 340/572.1 |
| 6,978,118 | B2 | * | 12/2005 | Vesikivi et al. .......... 340/572.1 |

FOREIGN PATENT DOCUMENTS

EP 0969346 A2 6/1999

* cited by examiner

*Primary Examiner*—Tammara Peyton
(74) *Attorney, Agent, or Firm*—Steven P. Skabrat

(57) ABSTRACT

Methods and apparatus for correlating physical and logical attributes of devices include associating logical-tags (L-tags) and physical-tags (P-tags) with electronic devices. A P-tag includes a P-tag identifier, which can be read by a P-tag reading device, regardless of whether power is applied to the electronic device. In one embodiment, a system includes a P-tag comprising a radio frequency identification (RFID) tag having a non-volatile memory to store physical and logical attribute information; and an electronic device associated with the RFID tag, the electronic device having a processor and a bus, and being communicatively coupled to the RFID tag over the bus, the processor to execute instructions to read information from and write information to the non-volatile memory of the RFID tag.

8 Claims, 6 Drawing Sheets

METHOD AND APPARATUS FOR RFID TAG WHEREIN MEMORY OF RFID TAG IS PARTITIONED INTO TWO SECTIONS FOR READING USING WIRELESS INTERFACE AND WRITING USING BUS

TECHNICAL FIELD

The inventive subject matter pertains to methods and apparatus to manage attributes of various assets and, more particularly, to methods and apparatus to store and access information relating to electronic devices stored on external machine-readable tags.

BACKGROUND

Entities that manage large numbers of computer systems often use asset-tracking techniques to keep track of the physical and/or logical attributes of those systems. For example, a physical attribute that is often maintained is a computer system's physical location. Logical attributes that are often maintained are a computer system's name and Internet Protocol (IP) address.

Physical location information is desirable to discourage theft, to optimize use of resources, to maintain knowledge of the quantities and qualities of computing assets, and to provide the ability to locate particular computer systems when they are needed. One method of physical attribute tracking is to automatically generate and maintain a location map, which depicts the locations of various computer systems within a facility. Another method is to generate and maintain a physical attribute database, which includes information about the locations in an electronic form.

Logical attribute information is desirable to track computer usage, connectivity, health and status, installed software information, and hardware capabilities, for example. In some cases, logical attribute information is maintained in a logical attribute database, which includes information about a computer system's name (e.g., identity), IP address, software version information, and other logical attributes, for example.

Prior methods for maintaining asset information are deficient in at least several ways. First, they may require a human operator to manually keep the location maps and/or attribute databases synchronized and up-to-date. In a dynamic environment with extensive migration and mobility of computer systems and other electronic devices, maintaining this information is a time-consuming process, and the information quickly becomes out-of-date. Another problem that exists with prior asset-tracking techniques is that physical attribute information and logical attribute information are often separately maintained. Accordingly, it is burdensome to retrieve both of these types of information for a particular asset.

In some situations, out-of-date information can have serious negative consequences. For example, a datacenter typically includes at least one host computer system, which is responsible for providing services to remote users. Such a datacenter may include one or more backup computer systems, which can be used to replace the current host computer system in the event of a failure. When a host failure occurs, it is desirable to rapidly locate a backup host and bring the backup host online. If the physical or logical attribute information for potential backup hosts is out of date, an unacceptably long time may elapse before an acceptable backup host can be located and brought online.

In response, what are needed are methods and apparatus for maintaining asset attribute information in such a manner that the information is less prone to becoming out-of-date. Further needed are methods and apparatus that do not rely solely on human operators to maintain attribute information. Also needed are methods and apparatus that enable physical attribute and logical attribute information to be updated and correlated when physical or logical attribute changes occur. Additionally, methods and apparatus that allow the physical and logical attribute information to be accessed from either within a computer system or other electronic device as well as via an attribute reading and writing device are desirable.

BRIEF DESCRIPTION OF THE DRAWINGS

The appended claims point out, with particularity, different embodiments of the inventive subject matter described herein. However, the detailed description presents a more complete understanding of various embodiments of the inventive subject matter when considered in connection with the figures, wherein like-reference numbers refer to similar items throughout the figures and:

DETAILED DESCRIPTION

Figure 1:
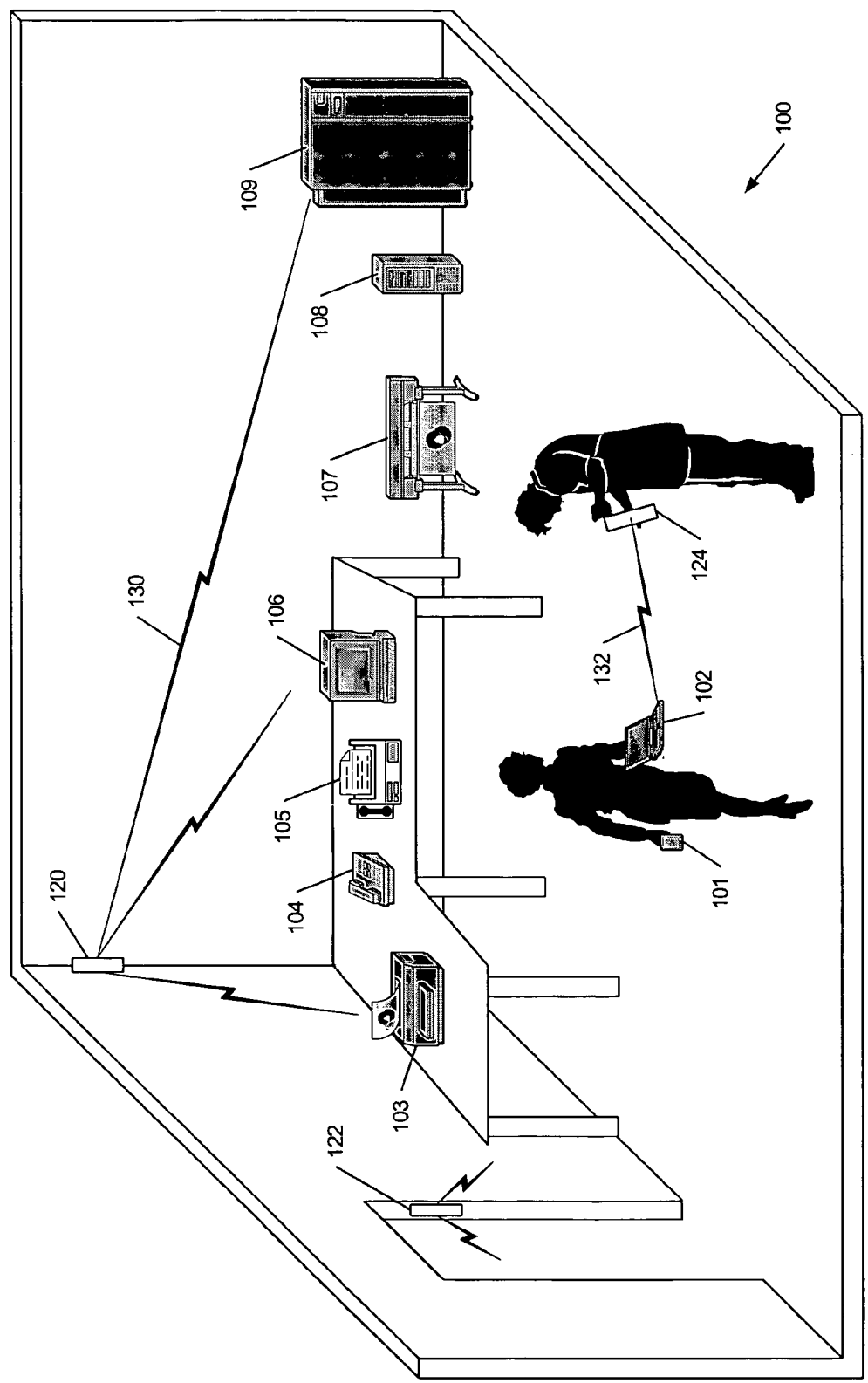
FIG. 1 is a perspective view of a type of environment in which embodiments of the invention may be implemented.

Various embodiments of the inventive subject matter described herein provide methods and apparatus to maintain and provide access to physical and/or logical attribute information for tracked assets, such as electronic devices. This information may be accessed by the electronic devices themselves, as well as by external tag reading devices. In embodiments of the present invention, an electronic device may directly read and/or write its associated external tag, while still retaining the property that the external tag may be externally machine readable by another device (such as a tag reader) even when the electronic device is powered off or is not connected to a communications network. In one example, when the external tag uses radio frequency identification (RFID) technology, embodiments of the present invention enable the electronic device to read and/or write non-volatile memory included within the external tag. By extending external tag technology in this way, numerous applications for tagging and tracking electronic devices (such as computer systems, for example) become possible.

Embodiments of the present invention provide a method and apparatus for an electronic device to read data from an externally machine-readable identifier tag (such as an RFID tag, for example). Embodiments also facilitate the writing of data by the electronic device to the external machine-readable tag such that the data can be subsequently read by an external reading device (such as an RFID tag reader, for example). This combination of reading and writing of the external machine-readable tag by both the tagged electronic device and the external reading device allows for sophisticated asset management and electronic device provisioning solutions where asset tags (i.e., external machine-readable tags) are dynamic, thereby allowing exchange of information between the electronic device, the asset tag, and the tag reader.

Embodiments of the inventive subject matter may be referred to, individually and/or collectively, herein by the term "invention" merely for convenience and without intending to voluntarily limit the scope of this application to any single invention or inventive concept if more than one is in fact disclosed.

Prior art methods for asset tracking are prone to becoming inaccurate very quickly. This is particularly true in tracking physical attributes and logical attributes. A "physical attribute" is defined herein to mean an attribute of an asset that is describable in relation to the asset's physical position or appearance features within the physical world, such as an asset's physical location, orientation, appearance, and the like. A physical attribute can be deduced and/or read by external machinery without requiring the target device to be powered or connected to a computer network. A "logical attribute" is defined herein to mean an attribute of the asset that is describable by the asset's identity or capabilities within a system, such, such as an asset's identification, device type, owner, user, network address, configuration, and the like.

By associating a physical-tag (P-tag) and a logical-tag (L-tag) with selected assets (i.e., devices), various embodiments of the invention enable physical and/or logical attributes of a plurality of assets to automatically be maintained and correlated. This serves at least several purposes, including theft detection and deterrence, asset location determination, asset configuration information, and owner identification, among other things.

FIG. 1 is a perspective view of a type of environment in which embodiments of the invention can be implemented. Specifically, FIG. 1 illustrates a room 100, which includes a plurality of electronic devices 101, 102, 103, 104, 105, 106, 107, 108, and 109.

The term "electronic device" is defined herein as any type of device that has processing capabilities, and which is capable of receiving and sending messages over a wired or wireless communication link. As FIG. 1 illustrates, electronic devices include, for example but not by way of limitation, personal data assistants (PDAs) 101, laptop computers 102, printers 103, telephones 104, fax machines 105, desktop computers 106, plotters 107, server computers 108, and mainframe computers 109. Electronic devices also include cellular and portable telephones, pagers, radios, monitors, televisions, global positioning system (GPS) receivers, audio and video recording and/or playing equipment, computer peripheral devices, electronic test equipment, vehicles (e.g., airplanes, trucks, automobiles, watercraft), subsystems (e.g., motherboards, video cards, disk drives, etc.), and any other electronic device that is electronically addressable and includes processing capabilities.

Selected ones of the electronic devices 101-109 include a Physical tag (P-tag) and a Logical tag (L-tag), which will be described in detail herein. In one embodiment, an L-tag includes information that is stored in a storage medium, and is readable using a software agent executed by the electronic device. The L-tag information includes at least one L-tag identifier (ID) and various logical information, in one embodiment.

The software agent can retrieve various L-tag information from the storage medium, and send the information to a recipient device. Accordingly, L-tag information can be conveyed over a wired or wireless network connection between the electronic device and the recipient device. In some cases, the recipient device may have requested the L-tag information. In other cases, the electronic device may send the L-tag information to the recipient device without a specific request.

An L-tag ID comprises an ASCII value, a digital value, or another identifier that is readable by a software agent. In one embodiment, an L-tag ID associated with an electronic device enables that device to be uniquely identified. In another embodiment, an L-tag ID enables the device to be uniquely identified when the ID is correlated with other information (e.g., P-tag indicator, device location, device type or class, and or other logical information). Logical information can include, for example, a device type, hardware and/or software configuration information, owner and/or user information, IP address, and various other types of information, which will be discussed in more detail later.

A P-tag is a device that includes at least one P-tag ID. A P-tag ID includes an alphanumeric value, a symbol, a pattern, or another identifier that is machine readable. In one embodiment, a P-tag ID associated with an electronic device enables that device to be uniquely identified. In another embodiment, a P-tag ID enables the device to be uniquely identified when the ID is correlated with other information (e.g., L-tag ID, device location, device type or class, and or other logical information). Besides a P-tag ID, a P-tag may include other physical attribute and logical attribute information associated with an electronic device. In one embodiment, a P-tag is both readable and writable (e.g., by the electronic device it is associated with and also by an RFID reader/writer), and thus the information stored within the P-tag can be modified. In one embodiment, the P-tag may be modified by either the electronic device associated with it, by a P-tag reading device (e.g., an RFID reader/writer), or both.

In one embodiment, a P-tag ID is readable regardless of whether power is applied to the electronic device to which the P-tag is attached. A P-tag includes a P-tag ID that is readable using a radio-frequency (RF) signal, in one embodiment. This type of device is referred to herein as a radio-frequency identification (RFID) P-tag.

In one embodiment, P-tag IDs are readable via an "over the air" interface by P-tag reading devices 120, 122, 124. P-tag reading devices 120, 122, 124 can be stationary, portable or mobile devices. For example, P-tag reading device 120 is a stationary wall-mounted device, P-tag reading device 122 is a stationary doorway-mounted device, and P-tag reading device 124 is a portable hand-held device. In other embodiments (not shown), a P-tag reading device can be mounted on a mobile robot, a mail or cleaning cart, or virtually any other mobile or fixed structure.

During operation, a P-tag reading device 120, 122, 124 attempts to read one or more P-tag IDs in proximity to the reading device. For example, P-tag reading device 120 attempts to read P-tag IDs that can be associated with electronic devices 101-109 located in proximity to the device 120 (e.g., within room 100 or within a certain range). In one embodiment, detected P-tag IDs and/or other information are sent by the P-tag reading device 120 over a wired or wireless connection to a remote processing device (e.g., an asset management device or system), which can use the information to determine and track a device's location. In another embodiment, detected P-tag IDs are stored by P-tag reading device 120 for later download and/or analysis.

For embodiments that use RFID P-tags, P-tag reading device 120 can send out limited-range RF signals 130 in an attempt to detect RFID P-tags in proximity to the P-tag reading device 120.

In one embodiment, P-tag reading devices can be positioned in proximity to portal points, such as doorways, corridors, windows, gates, toll booths, or other points. For example, P-tag reading device 122 is positioned within a doorway. During operation, P-tag reading device 122 attempts to detect a P-tag that enters or exits the doorway, which indicates that the electronic device associated with the P-tag has passed through the passage point. As with the wall-mounted P-tag reading device 120, the portal-mounted P-tag reading device 122 can send detected P-tag IDs and/or other information over a wired or wireless connection to a remote processing device. The processing device can use this information to determine a device's location, and/or to detect potential theft or unauthorized movement of the device. In another embodiment, detected P-tag IDs are stored by P-tag reading device 122 for later download and/or analysis.

In still another embodiment, P-tag reading devices can be portable devices. For example, P-tag reading device 124 is a hand-held device, which a person can use to selectively read a P-tag in proximity to the device. FIG. 1 illustrates a man with a hand-held P-tag reading device 124, which is reading, over an air interface 132, a P-tag ID on a laptop computer 102 carried by a woman.

In one embodiment, portable P-tag reading device 124 stores the P-tag ID values that it encounters, for later download and/or analysis. In another embodiment, portable P-tag reading device 124 sends detected P-tag IDs and/or other information over a wireless connection to a remote processing device. The remote processing device can use this information to determine a device's location, and/or to detect potential theft or unauthorized movement of the device.

In one embodiment, portable P-tag reading device 124 is capable of accessing and displaying logical information that correlates with a particular P-tag ID. For example, but not by way of limitation, when portable P-tag reading device 124 detects a certain P-tag ID, portable P-tag reading device 124 can retrieve and display information such as the device owner's name. This enables an operator of the P-tag reading device 124 to determine whether the displayed device owner's name is the same as a name on a badge worn by the person carrying the device. Such information can be helpful for theft detection and deterrence, among other things.

P-tag reading device 124 accesses logical information from a storage medium included in the reading device 124, in one embodiment. This information can be loaded into the device, for example, on an occasional basis. In another embodiment, P-tag reading device 124 accesses logical information from the P-tag itself, if such logical information had been previously stored in the P-tag. In still another embodiment, P-tag reading device 124 accesses logical information over a wired or wireless link with a remote processing device. In still another embodiment, P-tag reading device 124 accesses logical information from the L-tag within the electronic device itself. In this embodiment, tag reading device 124 includes an L-tag reading device, in addition to a P-tag reading device. The L-tag reading device can attempt to access L-tag information through a wired or wireless connection established between the tag reading device 124 and the electronic device 102.

The term "tag reading device" is meant to include a device that is capable of reading a P-tag, an L-tag, or both. The wired or wireless connection between the tag reading device 124 can be, for example but not by way of limitation, a Bluetooth connection, a wireless local area network (WLAN) connection, or a wired network connection (e.g., the Internet, a local area network, a wide area network, etc.).

In other embodiments, a fixed tag reading device can include the same capabilities as the portable tag reading device 124 described above. For example, wall-mounted and doorway-mounted devices 120, 122 can include L-tag reading capabilities, in addition to P-tag reading capabilities. In addition, a tag reading device can include wired and/or wireless connections to a network, which can be used to communicate tag IDs and/or other information.

In one embodiment, each tag reading device 120, 122, 124 is capable of detecting tag IDs within a particular range. The range can be very short (e.g., several inches or feet) or very long (e.g., hundreds of feet or miles). In one embodiment, the detection range for a tag reading device is adjustable by adjusting the sensitivity of the tag reading device and/or the transmission power of the electronic devices 101-109.

P-tag and L-tag IDs can be readable over or through other types of media, in addition to an air interface. For example, but not by way of limitation, a P-tag ID is readable through water, solid objects, and other media, in various embodiments.

An L-tag is readable by a software agent that is executed by an electronic device. An L-tag can be located substantially within the interior of the device, although it does not necessarily need to be so located.

In one embodiment, a P-tag is readable by a P-tag reading device that is external to the electronic device. The P-tag can be located on the exterior of the electronic device, although it does not necessarily need to be so located. Although a P-tag can be located on the exterior of a device, a P-tag can also be located within a device in a manner that it is not visible from the outside. For an RFID P-tag or a magnetic P-tag, a corresponding P-tag reading device can be capable of reading a P-tag ID and other P-tag information through various surfaces and interior structures associated with the device. Therefore, an RFID P-tag or a magnetic P-tag can be located within the device so that it is not visible from the exterior.

In the description of the various embodiments, each electronic device (e.g., devices 101-109) includes one P-tag and one L-tag. In other embodiments, an electronic device could include multiple P-tags and/or L-tags. For example, it may be desirable to include an L-tag for each printed circuit board or other processing component within a particular computer or other device. In such an embodiment, one P-tag ID could correspond to multiple L-tag IDs. Other types of uses of the various embodiments could be imagined by those of skill in the art based on the description herein.

The use of the term "environment" is not meant to imply that embodiments of the invention can only be implemented in limited, defined geographical areas. Although embodiments of the invention can be implemented in limited, defined geographical areas (e.g., a room, building, campus), embodiments of the invention also can be implemented in undefined, limitless geographical areas. For example, in a system that tracks mobile assets, the environment in which embodiments are implemented can be worldwide.

Various embodiments can be implemented in a system in which asset-tracking information is centrally managed by an "asset manager." In other embodiments, asset-tracking information may be managed by a distributed entity.

Figure 2:
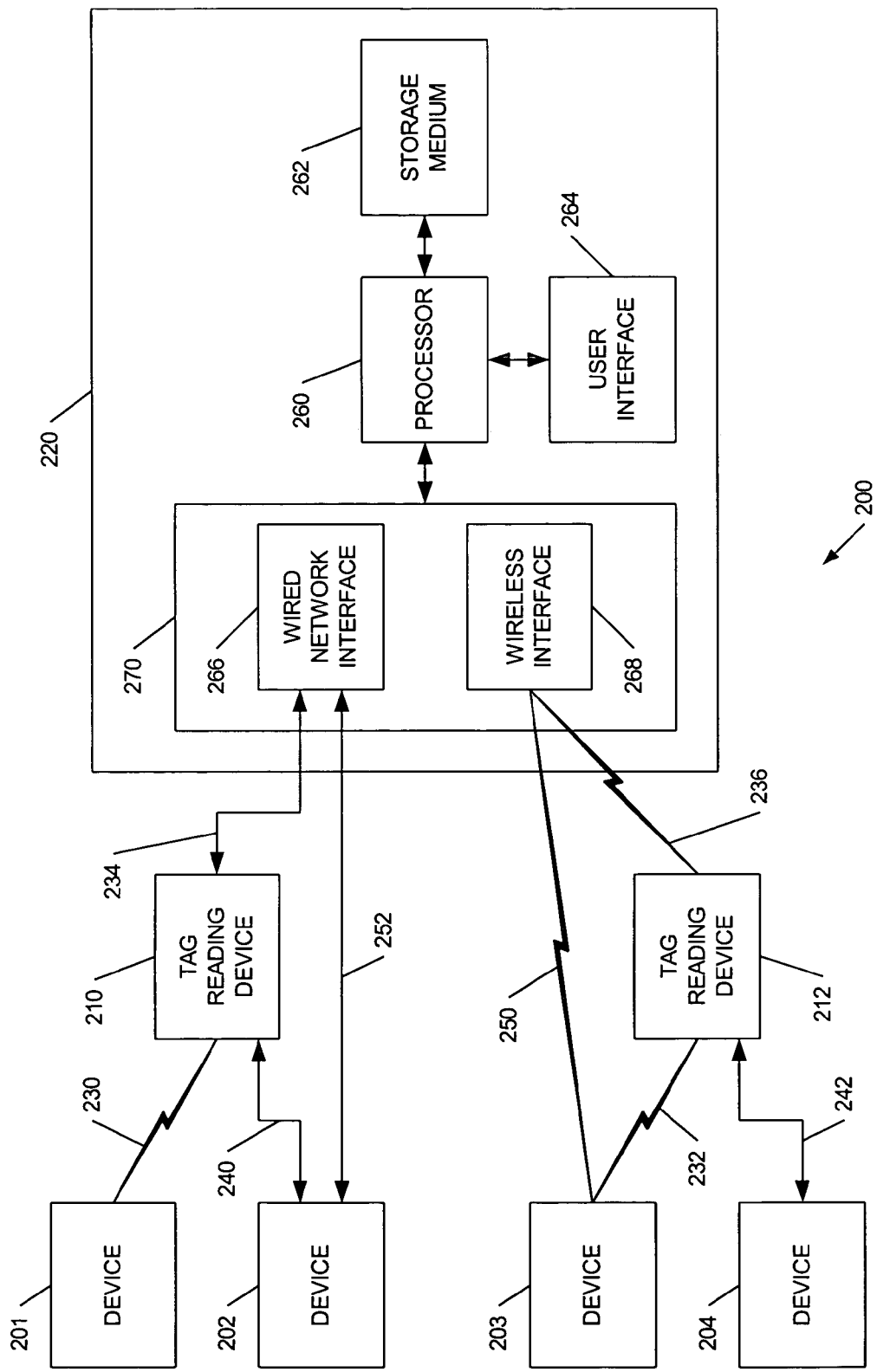
FIG. 2 is a simplified block diagram illustrating an asset-tracking system, in accordance with an embodiment of the invention.

FIG. 2 is a simplified block diagram illustrating an asset-tracking system 200, in accordance with an embodiment of the invention. System 200 includes a plurality of electronic devices 201, 202, 203, 204, at least one tag reading device 210, 212, and at least one asset manager 220.

Selected ones of electronic devices 201-204 include a P-tag and/or an L-tag. In various embodiments, the P-tag and/or L-tag are readable using a tag reading device 210, 212, as well as by the electronic device associated with the P-tag and/or L-tag. A tag reading device 210, 212 can include a P-tag reading device, an L-tag reading device, or both, in various embodiments.

In one embodiment, the P-tag is readable by a tag reading device 210, 212 over an air interface 230, 232 using an RF signal. In some embodiments, described below, the P-tag also is writable by the tag reading device 210, 212 over the air interface 230, 232, as well as by the device 201-204 itself. The P-tag ID and other P-tag information can be stored locally within the tag reading device 210, 212, and/or sent to an asset manager 220 via hardwired links 234, wireless links 236, and/or combinations of these types of links. The links between the asset manager 220 and the tag reading devices 210, 212 can be direct, or intervening nodes (not illustrated) can exist between the asset manager 220 and the devices 210, 212.

The L-tag is also readable by a tag reading device 210, 212, in one embodiment. The L-tag is readable over the air interface 230, 232 using a wireless connection (e.g., a WLAN or Bluetooth connection), in one embodiment. In addition or alternatively, the L-tag is readable over a wired connection 240, 242, which can include one or more ports and intermediate devices (e.g., computers). For example, a tag reading device 210, 212 can include a port that enables the tag reading device 210, 212 to be connected to another computer and/or directly to a network, which is also connected to the device 201-204 whose L-tag is being read.

To read the L-tag, tag reading device 210, 212 sends an information request message to a device 201-204, in one embodiment. The device 201-204, in turn, invokes a software agent, which processes the request and returns the requested information to the tag reading device 210, 212, as will be described in more detail later. Tag reading device 210, 212 can then store the L-tag information locally, and/or it can send the L-tag information to an asset manager 220 via a hardwired link 234 or a wireless link 236.

Besides a tag reading device 210, 212, other devices also can request L-tag information from a device 201-204. For example, asset manager 220 can request L-tag information from a device 201-204 without an intervening tag reading device 210, 212. Such a request can be made, in various embodiments, over wireless links 250, hardwired links 252, and/or combinations of these types of links. The links between the asset manager 220 and the devices 201-204 can be direct, or intervening nodes (not illustrated) can exist between the asset manager 220 and the devices 201-204. Because asset manager 220 can request and receive L-tag information, asset manager 220 also can be considered an L-tag reading device.

Receipt of an L-tag information request message by a device 201-204 is an event that triggers the device 201-204 to send L-tag information to the requester. In some instances, other types of triggering events can prompt a device 201-204 to send L-tag information to asset manager 220 or to another device. For example, but not by way of limitation, other triggering events include detection of a device configuration change, expiration of a time period, the occurrence of a particular time or date, and/or power-up or power-down of the device.

Asset manager 220 includes at least one processor 260, at least one storage medium 262, a user interface 264, and a communications interface 270. In embodiments where tag reading devices 210 and/or electronic devices 201-204 communicate with asset manager 220 over links that include a wired link to asset manager 220 (e.g., the Internet, a LAN, a WAN, etc.), communications interface 270 includes a wired network interface 266. In embodiments where tag reading devices 210 and/or electronic devices 201-204 communicate with asset manager 220 over links that include a wireless link to asset manager 220, communications interface 270 includes a wireless interface 268.

L-tag and/or P-tag information can be received over communications interface 270. In addition, L-tag information request messages can be sent by asset manager 220 over communications interface 270. These L-tag information request messages can be sent directly to devices 201-204, or they can be sent to tag reading devices 210, 212, which in turn retrieve the requested L-tag information from the devices 201-204. Asset manager 220 also can send P-tag ID request messages to tag reading devices 210, 212. The tag reading devices 210, 212, in turn, can read and return the P-tag IDs for one or more P-tags in proximity to the tag reading devices 210, 212.

Processor 260 is operable to perform a number of tasks. For example, but not by way of limitation, processor 260 maintains tracking records within storage medium 262, formulates information request and other messages, processes and stores received L-tag and P-tag information, provides stored tracking information to requesting devices, among other things. In addition, processor 260 responds to actions indicated by a system user, who invokes the actions by manipulating user interface 264.

User interface 264 can include, for example, a keyboard, pointing device, monitor, and/or other input/output devices. For example, a user may request, through user interface 264, that the asset manager 220 display a listing of all known electronic devices that have a certain hardware configuration, along with the current locations of those devices. Such a request will invoke the processor 260 to evaluate the hardware configuration information for the tracking records stored in storage medium 262, and to display the requested information. Numerous other types of requests can be made by a user, in various embodiments. These requests can be information retrieval requests or requests to perform certain L-tag and/or P-tag reading tasks. In other embodiments, various requests can be made by software agents within asset manager 220, without interaction with a human user.

Although only four electronic devices 201-204 and two tag reading devices 210, 212 are illustrated in FIG. 2, more or fewer of these elements can be included in a system. In addition, although only one asset manager 220 is illustrated, additional asset managers can be included in a system that provides asset management using a distributed management scheme.

More detailed descriptions of an electronic device (e.g., devices 201-204) and a tag reading device (e.g., tag reading devices 210, 212) will now be given.

Figure 3:
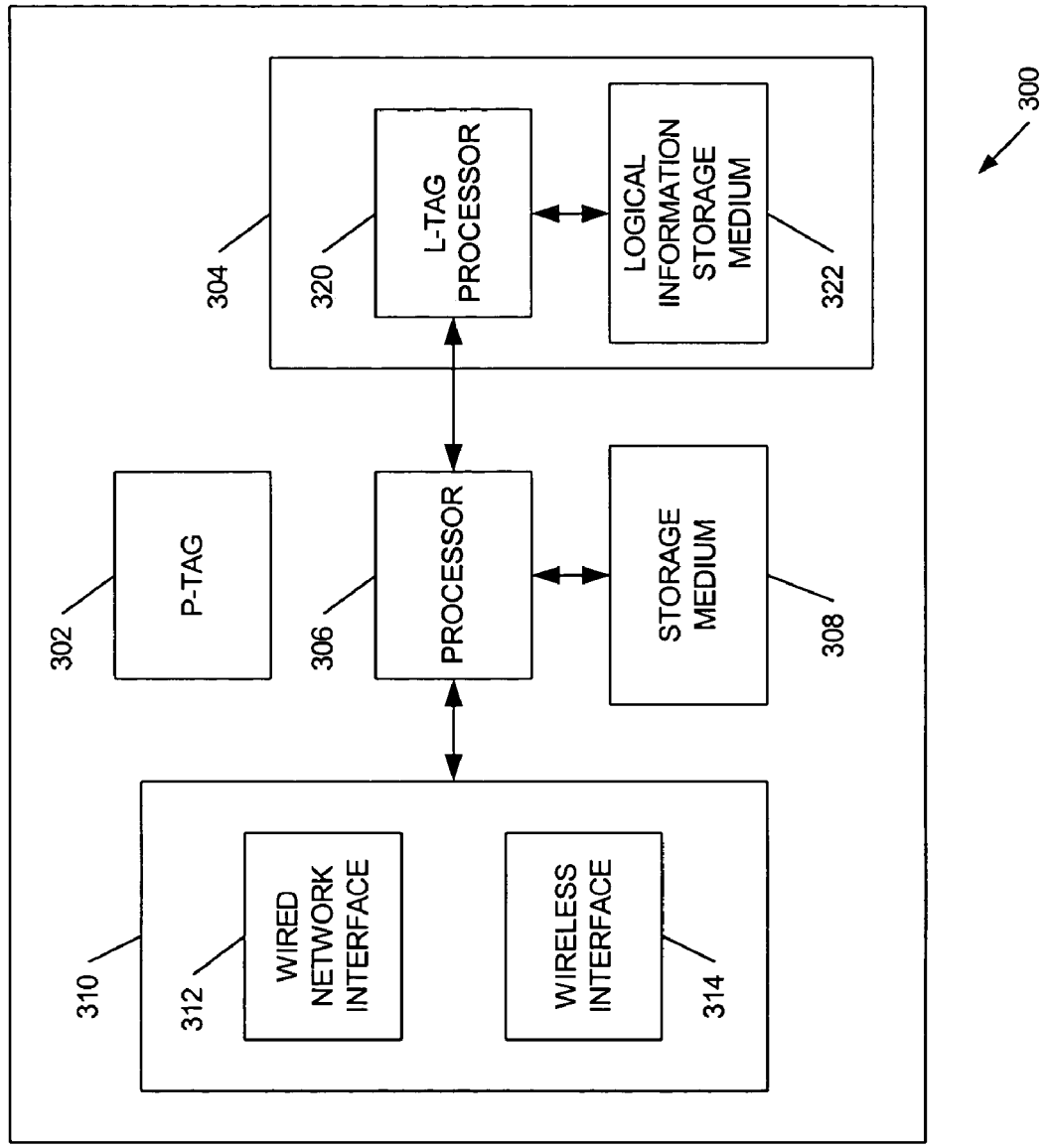
FIG. 3 is a simplified block diagram of an electronic device that includes a physical-tag (P-tag) and a logical-tag (L-tag), in accordance with an embodiment of the invention.

FIG. 3 is a simplified block diagram of an electronic device 300 that includes at least one P-tag 302 and at least one L-tag 304, in accordance with an embodiment of the invention. Device 300 also includes at least one processor 306 and at least one storage medium 308.

As described previously, P-tag 302 includes at least one P-tag ID, which can be read by an RF signal in one embodiment. In various embodiments, P-tag 302 can also include other P-tag information, such as other physical and/or logical attribute information. The P-tag 302 can be located so that it is either visible or not visible from the exterior of the device 300. Embodiments of a P-tag are described in more detail later.

In one embodiment, processor 306 runs the device's operating system and application programs, among other things. Programs and other information that are used by or produced by processor 306 are stored within storage medium 308.

Processor 306 also receives messages from and sends messages to a communications interface 310. In various embodiments, communications interface 310 includes either or both wired network interface 312 and wireless interface 314. The messages exchanged over communications interface 310 include, for example, logical information request messages, messages that include logical information and control messages. In some cases, processor 306 interacts with L-tag 304 to respond to and/or to produce these messages.

L-tag 304 includes an L-tag processor 320 and logical information storage medium 322, in one embodiment. Logical information storage medium 322 can be distinct from storage medium 308, or it can be located within the same device.

L-tag processor 320 is a distinct processing element from processor 306, in the illustrated embodiment. This serves the purpose of reducing the impact on L-tag 304 from system changes (e.g., operating system updates) that might corrupt the logical information stored within L-tag 304 or that might compromise the functionality of L-tag 304.

L-tag processor 320 is responsible for invoking one or more software agents to receive and store logical information within storage medium 322, and to retrieve logical information from storage medium 322 so that the information can be sent to a requester. For example, L-tag processor 320 may receive updated logical information produced by processor 306. The updated logical information can originate from a message received from a remote device (e.g., asset manager 220, FIG. 2), or it can originate from execution of a hardware and/or software detection program, in various embodiments. L-tag processor 320 causes the updated logical information to be stored within logical information storage medium 322, as will be described in more detail later.

L-tag processor 320 also retrieves logical information from logical information storage medium 322, in response to requests received from processor 306. For example, processor 306 may receive a request, over interface 310, for all or a portion of the device's logical information. Processor 306, in turn, passes this request on to L-tag processor 320. L-tag processor 320 then retrieves the requested information from storage medium 322, and it returns the information to processor 306. Processor 306 can then, in turn, return the information to the requester.

FIG. 3 illustrates an electronic device with a dedicated L-tag processor 320, which is responsible for invoking various software agents to access and maintain logical information within logical information storage medium 322. In an alternate embodiment, some or all of the various software agents associated with the L-tag can be implemented on another processor, such as processor 306, rather than including a separate processor such as L-tag processor 320.

In one embodiment, P-tag 302 and L-tag 304 are readable by a P-tag reading device and an L-tag reading device, respectively. In one embodiment, a single tag reading device can include the ability to read both a P-tag and an L-tag. In other embodiments, a tag reading device can include the capability to read either a P-tag or an L-tag, but not both. For purposes of brevity, an external device that includes the ability to read both a P-tag and an L-tag is described below.

Figure 4:
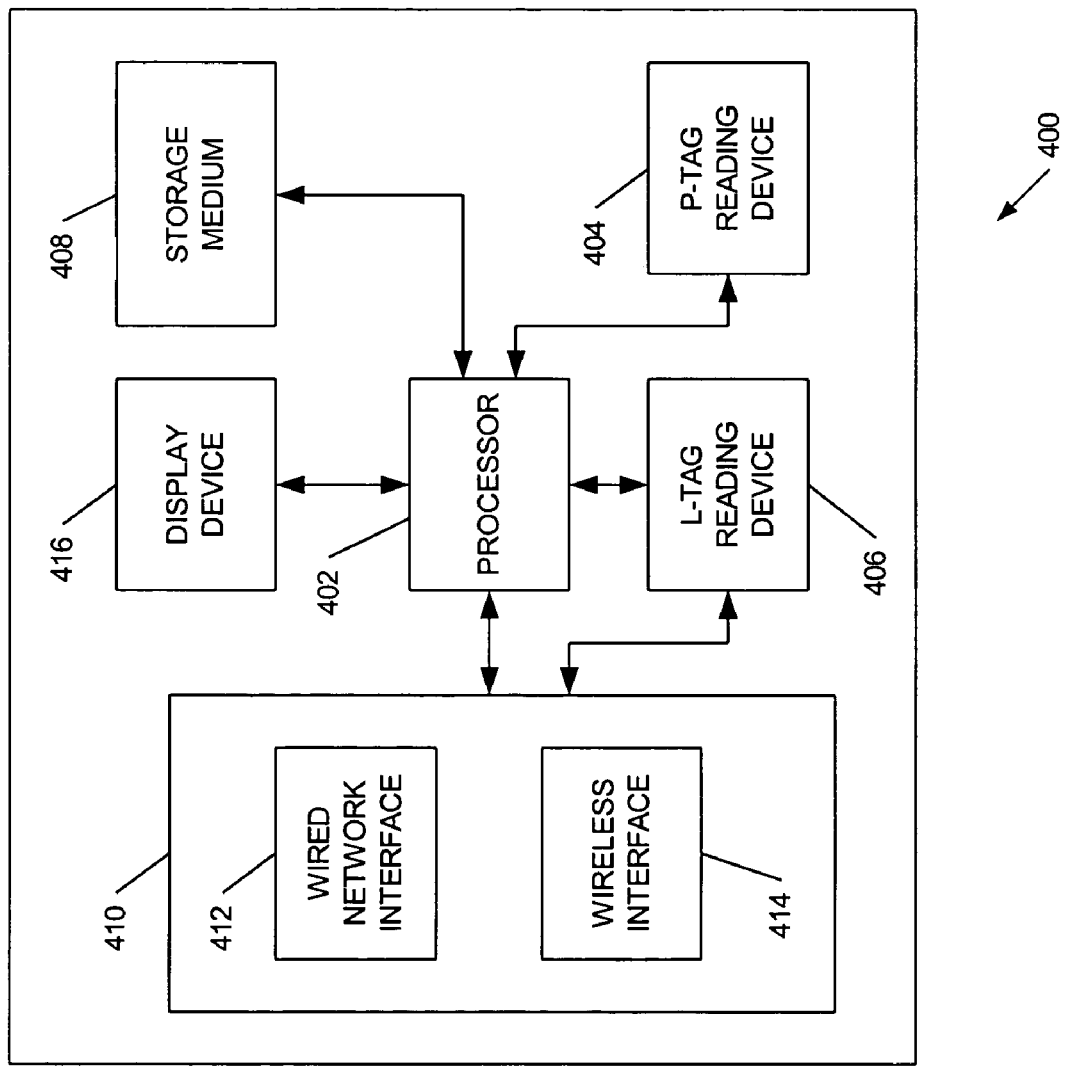
FIG. 4 is a simplified block diagram of a tag reading device, in accordance with an embodiment of the invention.

FIG. 4 is a simplified block diagram of a tag reading device 400, in accordance with an embodiment of the invention. Tag reading device 400 can be a stand-alone device, or it can form a portion of a larger device, such as a computer system, for example. In embodiments where tag reading device 400 forms a portion of a larger device, some or all elements of tag reading device 400 can be used for other purposes (e.g., general purpose processing), and the device can include other major elements. Tag reading device 400 can be stationary, portable or mobile, in various embodiments.

Tag reading device 400 includes a processor 402, a P-tag reading device 404, and an L-tag reading device 406, in one embodiment. In other embodiments, tag reading device 400 includes either a P-tag reading device 404 or an L-tag reading device 406, but not both.

Tag reading device 400 can be activated to read one or more P-tags and/or L-tags in any of several ways. In one embodiment, an operator of tag reading device 400 can provide a user input indicating that the operator would like device 400 to read one or more P-tags or L-tags. In another embodiment, tag reading device 400 can receive one or more control messages via communications interface 410, which indicate that device 400 should initiate a scan for P-tags and/or L-tags within range of the device 400. In still other embodiments, a P-tag and/or L-tag reading process can be initiated based on the occurrence of a periodic event, expiration of a time period, an input from a motion detector or other sensor, or some other triggering event.

In response to one of the triggering events described above, processor 402 creates one or more control signals or commands, which processor 402 provides to P-tag reading device 404 and/or L-tag reading device 406. When processor 402 receives P-tag and/or L-tag information, processor 402 can store the information in storage medium 408, send the information to a remote device via communications interface 410, and/or display the information via display device 416.

P-tag reading device 404 includes hardware that enables device 404 to read a P-tag over an air interface. The specific hardware included in P-tag reading device 404 depends on the type of P-tag that device 404 is designed to read. For example, if P-tag reading device 404 is designed to read a magnetic P-tag, then device 404 includes a chain of components designed to detect and decode magnetic energy. If P-tag reading device 404 is designed to read a barcode or other visually represented P-tag, then device 404 includes an optical scanner.

In one embodiment, P-tag reading device 404 is designed to read an RFID P-tag. Accordingly, P-tag reading device 404 includes an antenna, a transceiver, and a decoder. The antenna emits radio frequency activation signals in ranges anywhere from one inch to 100 feet or more, depending upon its power output and the radio frequency used. When an RFID P-tag is located within the range of the tag reading device, the tag reading device detects and decodes data encoded in the RFID P-tag. The electromagnetic field produced by the P-tag reading device 404 can be constantly present (e.g., when multiple tags are expected continually or when the system wants to detect the presence of P-tags as they enter the range of the P-tag reading device 404). If constant interrogation is not desired, the field can be activated by a sensor device (e.g., a motion detector), periodically, or in response to receipt of a control signal.

In one embodiment, where writable P-tags (e.g., RFID P-tags) are used, P-tag reading device 404 also can be capable of writing data to a P-tag over the air interface. For example, but not by way of limitation, P-tag reading device 404 could initialize or modify a P-tag ID, and write other information to the P-tag as well. In one embodiment, P-tag reading device 404 can write various physical and/or logical attribute information to a P-tag. If such information is stored within the P-tag, then a P-tag reading device 404 can access logical information from the P-tag, rather than from another source. Desirably, the logical information stored within the P-tag represents the most-current logical information (e.g., the information is the same as the information stored within the L-tag). Although the term P-tag "reading" device is used herein, it is not meant to imply that the device is only capable of reading a P-tag. In the embodiment described in this paragraph, the device also is capable of writing to a P-tag.

L-tag reading device 406 includes hardware that enables device 404 to read an L-tag. An L-tag may be read over an air interface if the electronic device whose L-tag is being read supports wireless communications, such as a WLAN or Bluetooth connections, for example. Alternatively, an L-tag may be read over a wired network, such a LAN, WAN or the Internet, for example. Accordingly, L-tag reading device 406 is capable of communicating with an electronic device whose L-tag is being read via communications interface 410.

Communications interface 410 enables device 400 to communicate with an asset manager (e.g., asset manager 220, FIG. 2) and/or other remote devices. In various embodiments, communications interface 410 includes either or both wired network interface 412 and wireless interface 414. The messages exchanged over communications interface 410 include, for example, P-tag request messages, P-tag IDs, logical information request messages, messages that include logical information, and control messages.

Storage medium 408 can be used locally to store P-tag IDs that are read by P-tag reading device 404. In one embodiment, this P-tag information can later be downloaded for analysis by a remote processing device (e.g., asset manager 220, FIG. 2).

In one embodiment, the remote processing device also includes knowledge of the location of the tag reading device when a P-tag is read. For example, a tag reading device 400 could be a fixed reader, whose location does not change. Alternatively, in one embodiment, tag reading device 400 can include a mechanism whereby it can determine its location (e.g., a global positioning system (GPS) receiver or other triangulation system), and associate the location with a P-tag ID, when the P-tag ID is read.

Storage medium 408 also can be used to store L-tag IDs and logical information. The L-tag IDs and logical information can be loaded into storage medium 408 from an asset manager, in one embodiment. This enables the last-known L-tag information for a device to be displayed by display device 416, when a P-tag is read. Alternatively, L-tag IDs and logical information can be read from an L-tag associated with a device, if the tag reading device 400 includes an L-tag reading device 406. This information can be stored for later analysis by a remote processing device, and/or displayed via the display device 416.

As indicated previously, several types of P-tags can be used, in various embodiments. For example, but not by way of limitation, a P-tag can include an RF readable storage element. This type of P-tag, referred to as an RFID P-tag, is used in one embodiment.

Figure 5:
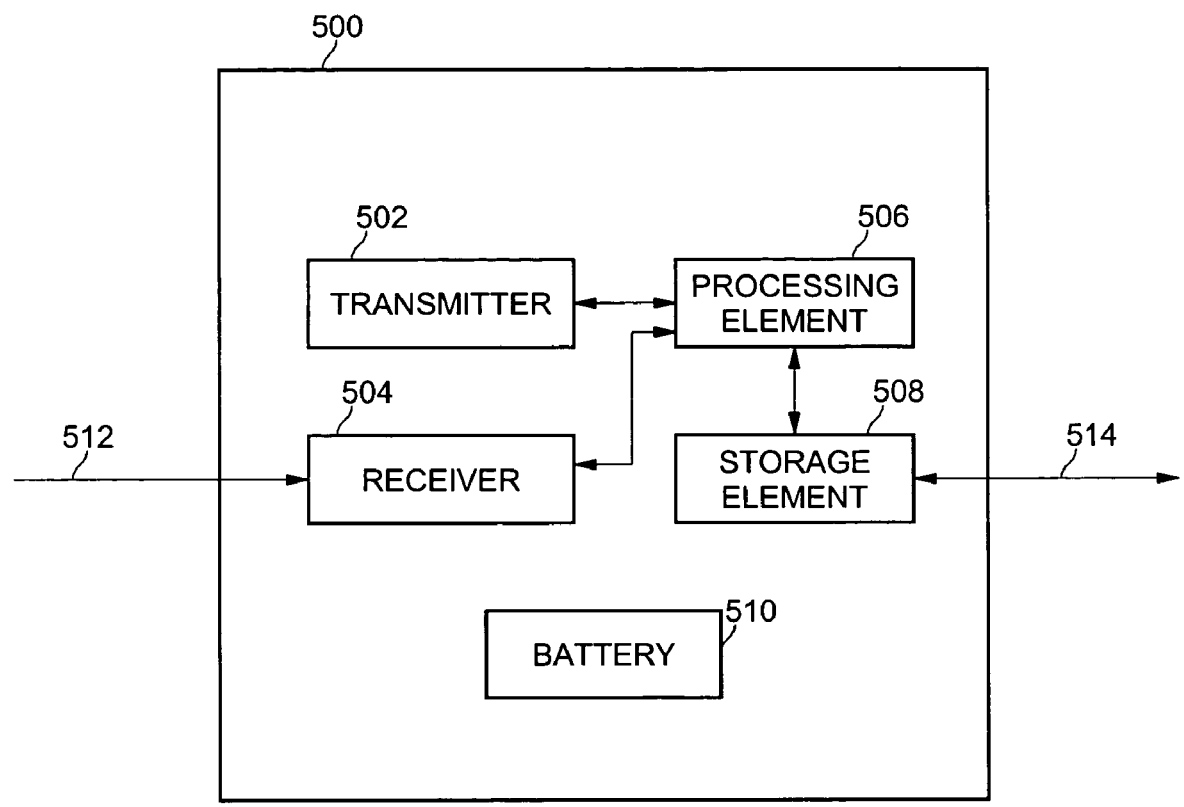
FIG. 5 is a simplified block diagram of a P-tag, in accordance with an embodiment of the invention.

FIG. 5 is a simplified block diagram of an RFID P-tag 500, in accordance with an embodiment of the invention. RFID P-tag 500 basically functions as a transponder. Accordingly, RFID P-tag 500 includes a transmitter 502, a receiver 504, a processing element 506, and a storage element 508. Signals may be received by the RFID tag over logical lines 512 (e.g., wireless) and/or 514 (e.g., wired). When receiver 504 receives an interrogation signal from a P-tag reading device (e.g., device 404, FIG. 4), processing element 506 retrieves an encoded identification signal from storage element 508, and it causes transmitter 502 to transmit the encoded identification signal. The encoded identification signal is a P-tag ID, in one embodiment.

Several types of RFID P-tags can be used, in various embodiments. An RFID P-tag can be passive or active, and it can be read-only or read-write capable. A passive RFID P-tag operates without a separate external power source, and it obtains operating power generated from the P-tag reading device. A read-only RFID P-tag typically is passive, and it is programmed with a unique set of data (e.g., 32 to 128 bits) that cannot be modified. This set of data is referred to herein as a "static P-tag ID."

A read-write capable RFID P-tag is typically active, and it operates with a separate external power source (e.g., battery 510). An active RFID P-tag can include a static P-tag ID and a "dynamic P-tag ID." In one embodiment, a dynamic P-tag ID is an identifier that can be written to or changed. In one embodiment, when a P-tag is read, the P-tag transmits the dynamic P-tag ID. In another embodiment, the P-tag transmits the static P-tag ID. In still another embodiment, the P-tag transmits both the static and the dynamic P-tag IDs.

A read-write capable RFID P-tag also can be used to store physical and/or logical attribute information, in one embodiment. This information can be written and/or read by a P-tag reading device (e.g., P-tag reading device 404, FIG. 4) or, in one embodiment, by the electronic device itself. For example, a P-tag reading device can write a version of the logical and/or physical attribute information within the RFID P-tag. In this embodiment, a P-tag reading device would then be able to access the stored version of the information, rather than accessing other versions of the information stored in the device's L-tag, in the asset manager, or in another device. In another example, the electronic device may update attribute information stored in the RFID P-tag based at least in part on changing device conditions.

The system and devices described above can be used for asset-tracking purposes, in one embodiment. The term "asset" is broadly defined herein as an entity for which physical and/or logical attributes are being tracked. In one embodiment, the assets that are being tracked include electronic devices, such as those illustrated in FIG. 1. In other embodiments, other types of assets can be tracked, including non-electronic objects and animate objects. The use of the term "device" herein, when referring to an asset being tracked, is not meant to limit the scope of the inventive subject matter. Instead, the term "device" should be construed broadly to include non-electronic, animate, and other objects.

Logical attributes may include, for example, information regarding the asset owner and/or user, the asset's configuration, serial number, and device type. Other logical attributes also can be tracked, in various embodiments. Physical attributes include, for example, an asset's physical location. The physical location information can be roughly approximated by the location of a tag reading device that reads the asset's P-tag. Alternatively, the physical location information can be more precisely approximated by the location of the device itself. Other physical attributes also can be tracked, in various embodiments, such as a device's orientation, appearance, and other physical attributes.

In one embodiment, the RFID P-tag may be read and/or written to by the electronic device to which it is attached or otherwise associated. A permanent or semi-permanent externally machine-readable tag may be physically attached to the electronic device in such a way as to be readable and writable by the electronic device, as well as by the P-tag reader described with reference to FIG. 4. For example, the machine-readable tag may be coupled to the electronic device via a bus. In one embodiment, the P-tag includes non-volatile storage (analogous to storage element 508 of FIG. 5) that is accessible by the electronic device, as well as within the P-tag. In one embodiment, the P-tag may be attached at manufacturing time to the motherboard of the electronic device (such as a computer system) providing the necessary connectivity with the device's processor so as to facilitate reading/writing operations, or attached subsequently as a pluggable device by the user after the related asset (i.e., the electronic device) is acquired. Since two entities (the electronic device and the external P-tag reader) could attempt to simultaneously access the P-tag's non-volatile memory, well known synchronization and/or locking techniques may be used to ensure exclusive write operations.

Figure 6:
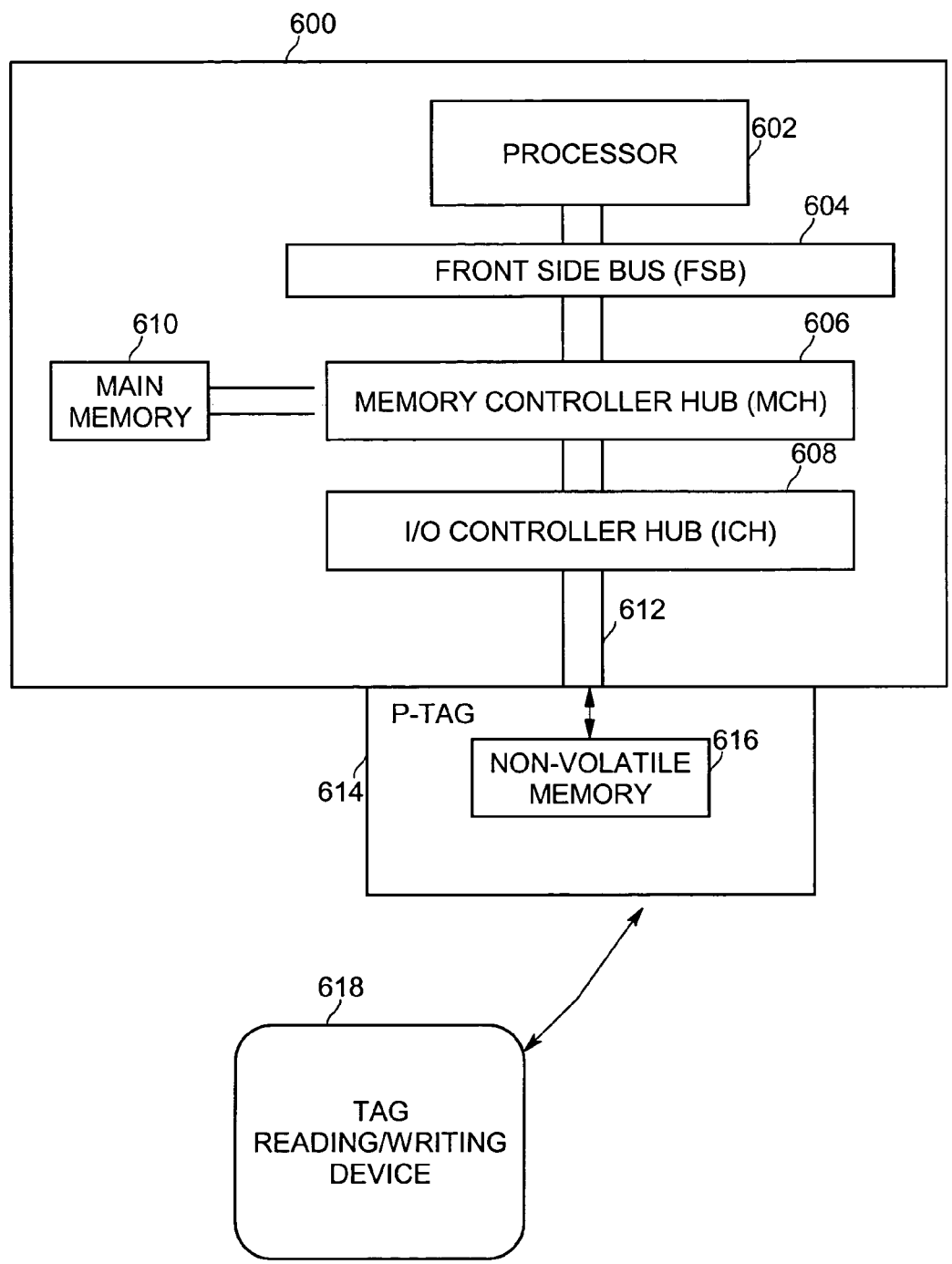
FIG. 6 is a simplified diagram of an electronic device, in accordance with an embodiment of the invention.

FIG. 6 is a simplified block diagram of an electronic device 600 according to one embodiment of the present invention. The electronic device comprises a processor 602 for executing instructions, the processor being coupled to a memory controller hub (MCH) 606 over a front side bus (FSB) 604. The MCH communicates with a main memory 610 for the device, as well as an I/O controller hub (ICH) 608. The ICH communicates over a bus 612 with a P-tag 614. In one embodiment, the bus 612 comprises a System Management Bus (SMBUS). In other embodiments, other bus technologies and/or formats may be used. A non-volatile memory 616 may be provided within the P-tag to store information that is readable and writable by instructions being executed by the processor 602 and resulting control signals sent over the FSB, MCH, ICH, and bus 612, as well as readable and writable by the tag reading/writing device 618 using over-the-air techniques described earlier (e.g., RFID sensing).

In one example where the electronic device is a computer system, the computer system may be configured to write physical and/or logical attribute information into the non-volatile memory of the P-tag over the SMBUS. This information may be subsequently read using known RF techniques by the tag reading device for purposes of asset management or for other purposes. In one example, the electronic device may update physical and/or logical attribute information of the device by selectively modifying the non-volatile storage of the P-tag via a bus (such as SMBUS). In another embodiment, the electronic device may write the non-volatile memory of the P-tag using known wireless techniques.

In one embodiment, the storage within the non-volatile memory 616 inside the P-tag may be divided or partitioned into separate areas that are individually writable by the electronic device and by the tag reading/writing device.

The capabilities of the electronic device writing the P-tag and the P-tag reader reading the P-tag have many practical uses in corporate environments, such as for automated asset identification, provisioning, and in network management. Usage of embodiments of the present invention may ameliorate or eliminate the current situation where the logical and physical description of computing assets are performed in separate systems with manual data entry that are prone to errors and do not get automatically synchronized when significant changes occur in either of those domains, such as physical node moves, logical address changes, or the nature of the resource changes. Embodiments may also support dynamically configurable and automatically provisioned resources required to support on-demand computing and variants such as utility and autonomic computing. Embodiments may be useful in system management, where information such as a unique identifier, keys for encryption and digital certificates for authentication may be written by an external writer onto a P-tag at the time the electronic device is received in the enterprise. Once the electronic device boots up, the device may now read the information stored in the P-tag, which may support unique network identification for the device. This invention allows for management systems to provide customized services based on the P-tag assigned by a tagging authority.

In one example, when new computing devices are added to an enterprise, the devices are frequently required to be provisioned with special software to be compliant with the enterprise's computing environment. Typically this action is performed by trained Information Technology (IT) personnel. An embodiment of the present invention can be applied to significantly automate this process. The device may be assigned a P-tag and cryptographic keys and digital certificates (e.g., a self identity and a server identification certificate) can be written onto the P-tag as the device is processed upon receipt from a system vendor. The device can then be given to a user who can attempt to connect the device to the enterprise's computer network. Upon booting, the device can read the information previously written to the P-tag. The device can use the self identity certificate to authenticate itself to network resources. Correspondingly, the device may use the server certificate to authenticate a network-connected server which may perform various management-related functions on the device (such as provisioning, etc.).

The ability to tag electronic devices from the time of manufacturing and track them when either on-line or off-line, powered-up or powered-down, has many other potential uses, such as correlating failure statistics to specific manufacturing batches, automated tracking of leasing and warranty information, and so on.

The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

The various procedures described herein can be implemented in hardware, firmware or software. A software implementation could use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, random access memories (RAMs), read only memories (ROMs), and the like.

It is emphasized that the Abstract is provided to comply with 37 C.F.R. §1.72(b) requiring an Abstract that will allow the reader to ascertain the nature and gist of the technical disclosure. It is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A system comprising:
a radio frequency identification (RFID) tag comprising a non-volatile memory to store physical and logical attribute information;
an electronic device associated with the RFID tag, the electronic device having a processor and a bus, and being communicatively coupled to the RFID tag over the bus, the processor to execute instructions to read information from and write information to the non-volatile memory of the RFID tag; and
a RFID tag reading device to read information from and write information to the non-volatile memory of the RFID tag over a wireless interface;
wherein the non-volatile memory of the RFID tag is partitioned into at least two sections, the electronic device to write to a first section using the bus and the RFID tag reading device to write to a second section using the wireless interface.

2. The system of claim 1, wherein the RFID tag reading device reads information from the RFID tag when the electronic device associated with the RFID tag is powered off.

3. The system of claim 1, wherein the bus comprises a system management bus (SMBUS).

4. The system of claim 1, wherein the RFID tag is attached to the electronic device.

5. The system of claim 1, wherein the electronic device comprises a computer system, and the RFID tag is physically attached to a motherboard of the computer system.

6. A method comprising:
storing at least one of physical and logical attribute information of an electronic device in a second section of a non-volatile memory on an RFID tag using an RFID tag reading/writing device over a wireless interface;
associating the RFID tag with the electronic device;
storing at least one of physical and logical attribute information in a first section of the non-volatile memory on the RFID tag by the electronic device over a bus; and
reading the RFID tag by the RFID tag reading/writing device over the wireless interface to obtain the at least one of physical and logical attribute information.

7. The method of claim 6, further comprising reading at least one of physical and logical attribute information stored on the RFID tag by the electronic device by accessing the non-volatile memory of the RFID tag over the bus communicatively coupling the RFID tag and the electronic device.

8. The method of claim 6, wherein the electronic device comprises a computer system, and the bus comprises a system management bus (SMBUS).

* * * * *